United States Patent
Moyer et al.

(10) Patent No.: US 7,099,973 B2
(45) Date of Patent: Aug. 29, 2006

(54) METHOD AND SYSTEM OF BUS MASTER ARBITRATION

(75) Inventors: William C. Moyer, Dripping Springs, TX (US); Michael D. Fitzsimmons, Austin, TX (US); Brett W. Murdock, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 365 days.

(21) Appl. No.: 10/402,165

(22) Filed: Mar. 26, 2003

(65) Prior Publication Data

US 2004/0193766 A1 Sep. 30, 2004

(51) Int. Cl.
*G06F 13/36* (2006.01)
*G06F 3/00* (2006.01)

(52) U.S. Cl. .................... 710/118; 710/18; 710/110; 710/116

(58) Field of Classification Search ................ 710/107, 710/110, 113, 119, 240, 305, 306, 309; 711/151, 711/172; 345/546; 709/208, 250; 714/37; 370/428
See application file for complete search history.

(56) References Cited

U.S. PATENT DOCUMENTS

| | | | | |
|---|---|---|---|---|
| 5,119,486 A * | 6/1992 | Albonesi | .................... | 711/172 |
| 5,193,149 A * | 3/1993 | Awiszio et al. | ............. | 709/250 |
| 5,297,292 A * | 3/1994 | Morimoto et al. | .......... | 710/113 |
| 5,345,566 A * | 9/1994 | Tanji et al. | ................. | 710/306 |
| 5,463,740 A * | 10/1995 | Taniai et al. | ................ | 710/119 |
| 5,572,686 A | 11/1996 | Nunziata et al. | | |
| 5,581,782 A * | 12/1996 | Sarangdhar et al. | ........ | 710/119 |
| 5,596,729 A * | 1/1997 | Lester et al. | ................. | 710/309 |
| 5,752,010 A * | 5/1998 | Herbert | ..................... | 345/546 |
| 5,826,045 A | 10/1998 | Reams | | |
| 5,915,102 A * | 6/1999 | Chin | .......................... | 710/113 |
| 5,923,859 A * | 7/1999 | Melo et al. | .................. | 710/113 |
| 6,073,199 A * | 6/2000 | Cohen et al. | ............... | 710/113 |
| 6,092,219 A * | 7/2000 | Porterfield | .................... | 714/37 |
| 6,157,989 A * | 12/2000 | Collins et al. | .............. | 711/151 |
| 6,163,826 A | 12/2000 | Khan et al. | | |
| 6,269,102 B1 * | 7/2001 | Hayashi | ........................ | 370/428 |
| 6,564,280 B1 * | 5/2003 | Walsh | ......................... | 710/305 |
| 6,571,306 B1 * | 5/2003 | Smith | ......................... | 710/240 |
| 6,823,410 B1 * | 11/2004 | Koike | ......................... | 710/107 |
| 6,823,411 B1 * | 11/2004 | Hofmann et al. | ........... | 710/110 |
| 2002/0099892 A1 * | 7/2002 | Olarig | ........................ | 710/240 |
| 2003/0097505 A1 * | 5/2003 | Kato | ......................... | 710/113 |
| 2003/0110231 A1 * | 6/2003 | Roy | ............................ | 709/208 |
| 2003/0200375 A1 * | 10/2003 | Kawaguchi | ................ | 710/309 |

FOREIGN PATENT DOCUMENTS

JP 2000035943 A * 2/2000

OTHER PUBLICATIONS

"PCI Arbiter Core," Actel Corporation data sheet, 5172152-2/1.02, Jan. 2002, 4 pp.
"MPC5200 User Manual," Section 16 "XLB ARBITER," Order No. MPC5200UM/D, Motorola, digital dna, Jul. 2003, pp. 1-17.

* cited by examiner

Primary Examiner—Christopher E. Lee

(57) ABSTRACT

A system (100) having a plurality of bus masters (111–113) coupled to an arbiter (150) is disclosed. An arbiter (150) is coupled to a first storage location (151) and a second storage location (152), where the first and second storage locations store bus master parking information for a system bus (141). The arbiter (150) receives a parking context indicator (131) that is used to select one of the first and second storage locations (151, 152) to provide bus master parking information to the arbiter (150).

8 Claims, 5 Drawing Sheets

METHOD AND SYSTEM OF BUS MASTER ARBITRATION

FIELD OF THE DISCLOSURE

The present disclosure relates generally to methods and systems of bus master arbitration, and more particularly to the parking of a bus master.

BACKGROUND

Data processing systems having multiple bus masters are commonplace in data processing environments. Parking of a bus master refers to a technique whereby it is anticipated which one of a plurality of bus masters is going to next request access to a specific system bus, or will have the greatest need to access the system bus quickly when it makes a request for the bus. If the parked bus master is indeed the master device that next requests access to the specific system bus, the arbitration overhead is reduced, thereby resulting in a more efficient use of system bus and bandwidth. Methods and systems that can improve bus master parking techniques would be useful.

BRIEF DESCRIPTION OF THE DRAWINGS

Various advantages, features and characteristics of the present disclosure as well as methods, operation, and functions of related elements of structure, and the combination of parts and economies of manufacture, will become apparent upon consideration of the following description and claims with reference to the accompanying drawings, all of which form a part of this specification.

DETAILED DESCRIPTION OF THE DRAWINGS

In accordance with the present disclosure, a method of parking a bus master is disclosed that selects one set of a plurality of sets of programmable bus master parking information based upon an operational context of the system. By being able to select different sets of programmable bus master parking information based upon an operational context, the bus master parked on a system bus can be updated quickly based upon the context change. In order to facilitate a better understanding, FIGS. 1–7 have been included illustrating specific embodiments of the disclosure, and are not intended to be limiting in nature.

Figure 1:
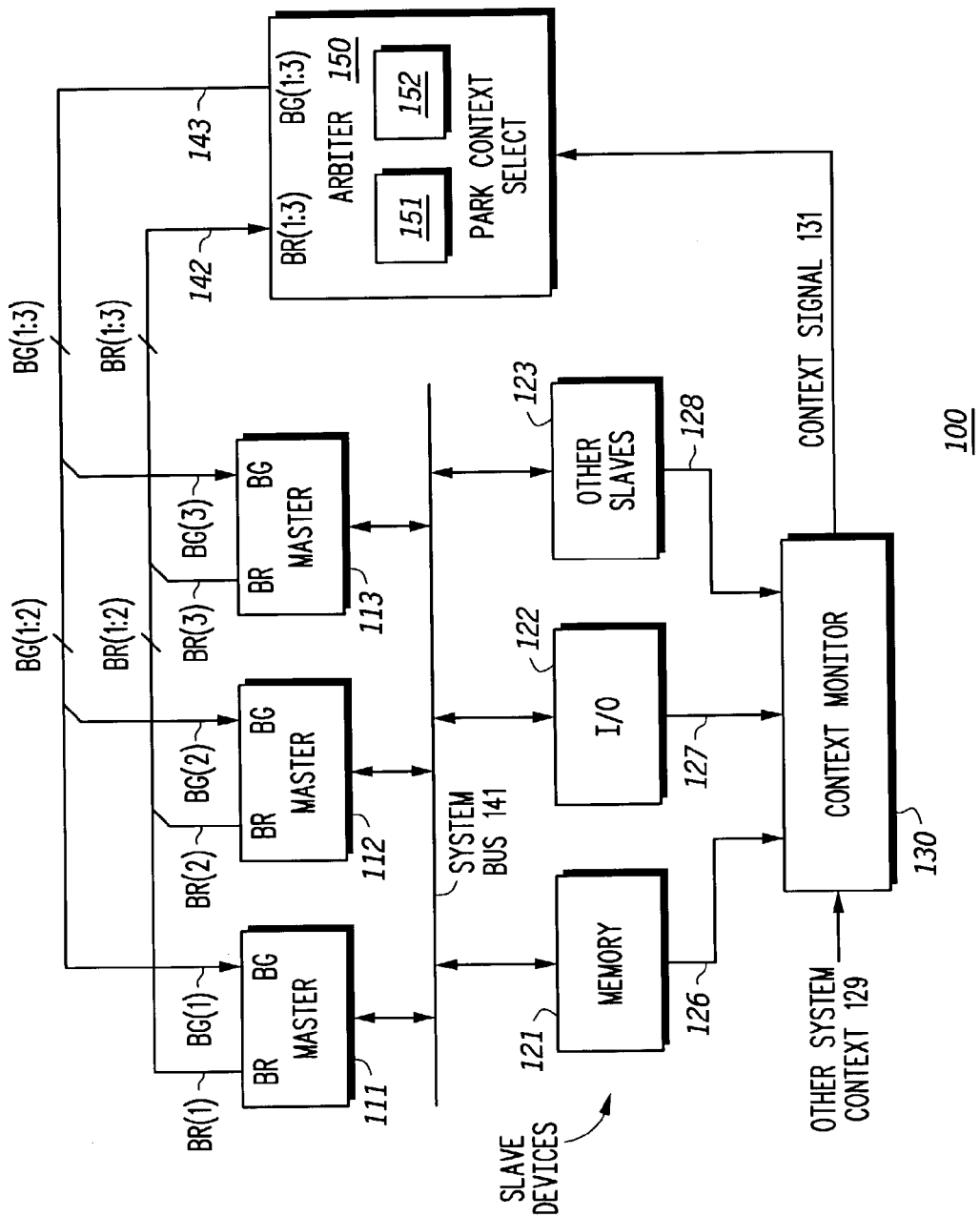
FIG. 1 illustrates, in block diagram form, a system in accordance with an embodiment of the present disclosure.

FIG. 1 illustrates, in block diagram form, a system 100 in accordance with the present disclosure. System 100 comprises Bus Masters 111–113, slave devices 121–123, context monitor 130, and Arbiter 150. The slave devices 121–123 comprise a memory 121, an input/output (I/O) module 122, and other slave devices 123.

Bus Masters 111–113 are coupled to the Arbiter 150 via bus 142 to provide bus request signals BR(1)–BR(3), respectively. In addition, Bus Masters 111–113 are coupled to the Arbiter 150 via bus 143 to receive bus grant signals BG(1)–BG(3), respectively. A System Bus 141, that is a slave bus, couples each Bus Master 111–113 to each slave device 121–123. The context monitor 130 is coupled to receive information from one or more of the slave devices 121–123 via buses 126–128, and other system context 129, and to provide a context signal 131 to the Arbiter 150.

In operation, the Arbiter 150 of system 100 has access to storage locations 151 and 152 that are used to store bus master parking information. Each set of bus master parking information at a storage location will generally indicate a specific manner for implementing bus master parking for a specific slave bus, such as system bus 141. Whether the Arbiter 150 accesses the bus master parking information at location 151 or 152 is based upon a state of the CONTEXT SIGNAL provided from the Context Monitor 130 and received at the PARK CONTEXT SELECT input of the Arbiter 150.

The Context Monitor 130 monitors information from one or more of the slave devices 121–123 as well as other system context 129 from other portions of system 100. In one embodiment, the information monitored by the Context Monitor 130 is interrupt information from one or more of the devices 121–123. In another embodiment, the information monitored by the Context Monitor 130 is state information, which with respect to the memory 121 can indicate a fullness of the memory 121. While Context Monitor 130 is illustrated as only monitoring the slave devices 121–123, it will be appreciated that the Context Monitor 130 can also be coupled to one or more of the Masters 111–113. In addition, other system context from system 100 may be monitored. As the context of the system is monitored, the state of the context signal can vary dynamically, thereby selecting a different set of bus master parking information to be used by the Arbiter 150. Although a single context signal 131 is shown, alternate embodiments may have multiple context signals 131 that are used to select bus master parking information.

Figure 2:
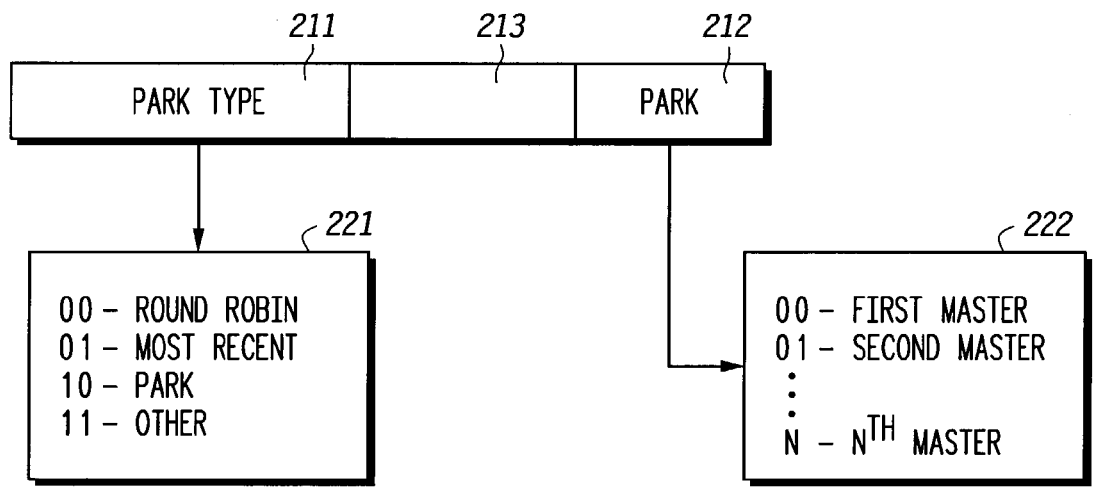
FIG. 2 illustrates, in block diagram form, a set of parking information of FIG. 1 in greater detail.

FIG. 2 illustrates in block diagram form, a register 200 that can be used to represent the storage locations 151 and 152. The register 200 comprises a parking-type field labeled PARK TYPE 211, a parking indicator field labeled PARK 212, and other fields 213. The PARK TYPE field 211 indicates a type of parking to be implemented by the arbiter 150. Examples of types of parking are indicated in informational box 221, and comprise a round robin parking of bus masters, parking a bus master most recently accessing the slave bus, and parking a specific bus indicated in the PARK 212 field.

When the PARK TYPE indicates that the PARK 212 field is to be used, a specific bus master indicated in the PARK field will be parked. Informational box 222 indicates values used to indicate which bus master should be parked. It will be appreciated that the PARK TYPE 211 field and the PARK 212 field can be writeable fields that can be changed as necessary by system and/or user software control. Alternatively, system and/or user control may provide park control information by way of one or more external terminals, such as an integrated circuit connection such as a conductive pin or bump.

Figure 3:
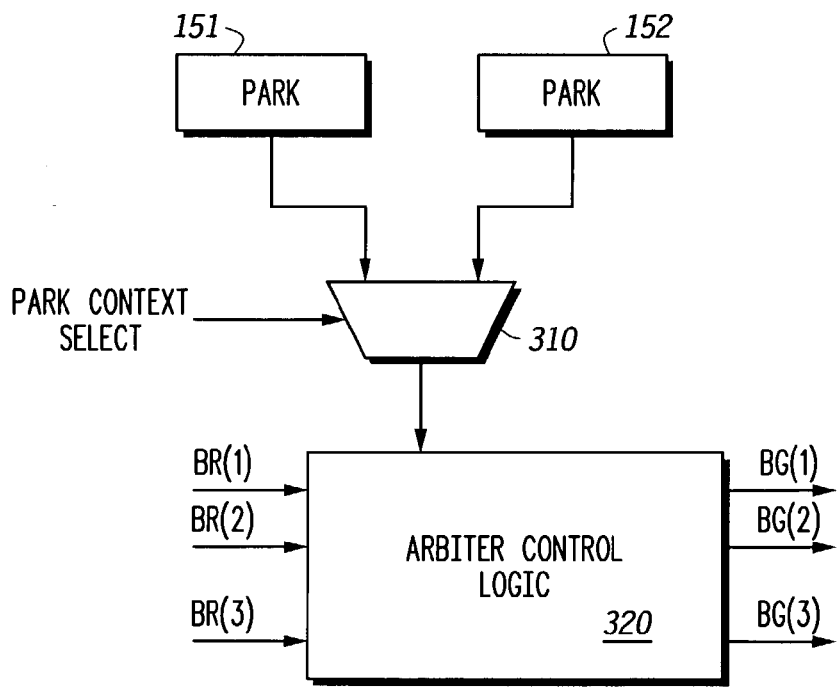
FIG. 3 illustrates, in block diagram form, a portion of an arbiter of FIG. 1 in greater detail.

FIG. 3 illustrates, in block diagram form, a portion of the arbiter of FIG. 1 used to facilitate selection of one of the storage areas 151 and 152, which contain parking information. The storage areas 151 and 152 are coupled to different inputs of a multiplexer 310. The select input of the multiplexer 310 receives a signal from at the PARK CONTEXT SELECT input of the Arbiter 150. The selected parking information based upon this input is provided to Arbiter Control Logic 320 that is illustrated as receiving one or more bus requests at inputs BR(1)–BR(3) and provides a bus grant over one of the bus grant outputs BG(1)–BG(3).

Figure 4:
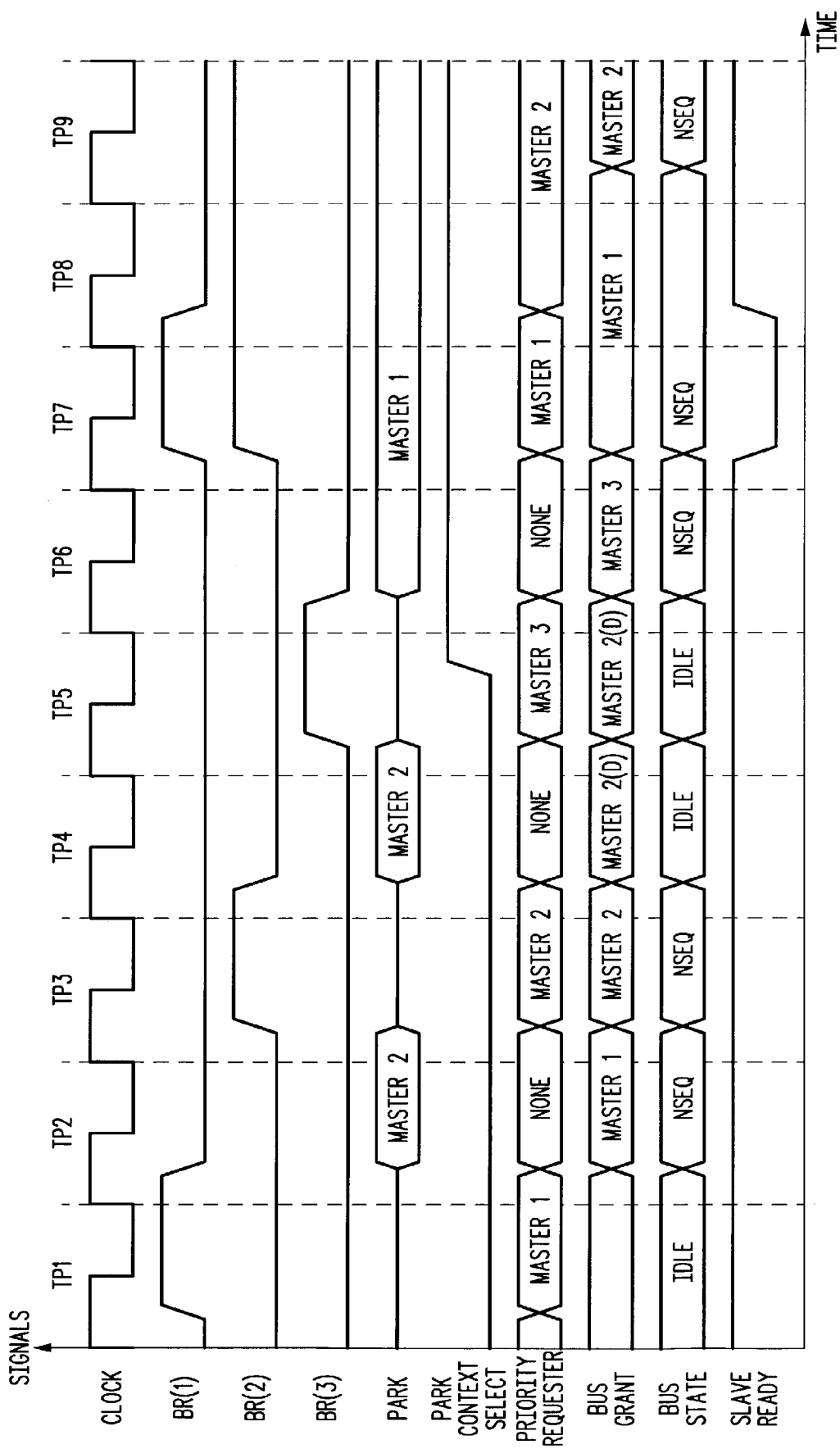
FIG. 4 illustrates a timing diagram in accordance with an embodiment of the present disclosure.

FIG. 4 illustrates a timing diagram indicating states of a plurality of signals during time periods TP1–TP9 in accordance with an embodiment of the present disclosure. The signals include: CLOCK which represents a bus clock from which time period TP1–TP9 are based; BR(1)–BR(3) are specific master bus requests which are illustrated as asserted when in a high state; PARK indicates when bus masters are parked; PARK CONTEXT SELECT indicates the state of the context signal that controls selection of one of the sets of parking information; PRIORITY REQUESTER indicates which master has the highest priority during a time period; BUS GRANT indicates when a requesting device has acquired control of the bus—when a bus master has control of the bus by default due to a previous grant it is indicated by the designator (D); BUS STATE indicates a state of the requested bus, where the state can be idle (IDLE) or active (NSEQ); and SLAVE READY indicates that the requested slave can complete the requested access.

Of particular interest with reference to the timing diagram of FIG. 4 is time TP5, where the PARK CONTEXT SELECT signal changes state to indicate a change in operating context. In response to the change in state of PARK CONTEXT SELECT, a different set of parking information is accessed that results in a first master, indicated by the MASTER 1 designator of the PARK signal, being parked at time period TP7. As a result of this change in parking information, the bus request BR(1) by the first master at TP7 results in the bus being made available for the first master at time TP7, as indicated on BUS GRANT at TP7, instead of one cycle later, as occurred with respect to the bus request BR(1) at time TP1. Prior to a change in context, MASTER 2 was selected for parking, specifically in time periods TP3 and TP5. As a result, MASTER 2 was able to begin an access in TP3 rather than TP4.

Figure 5:
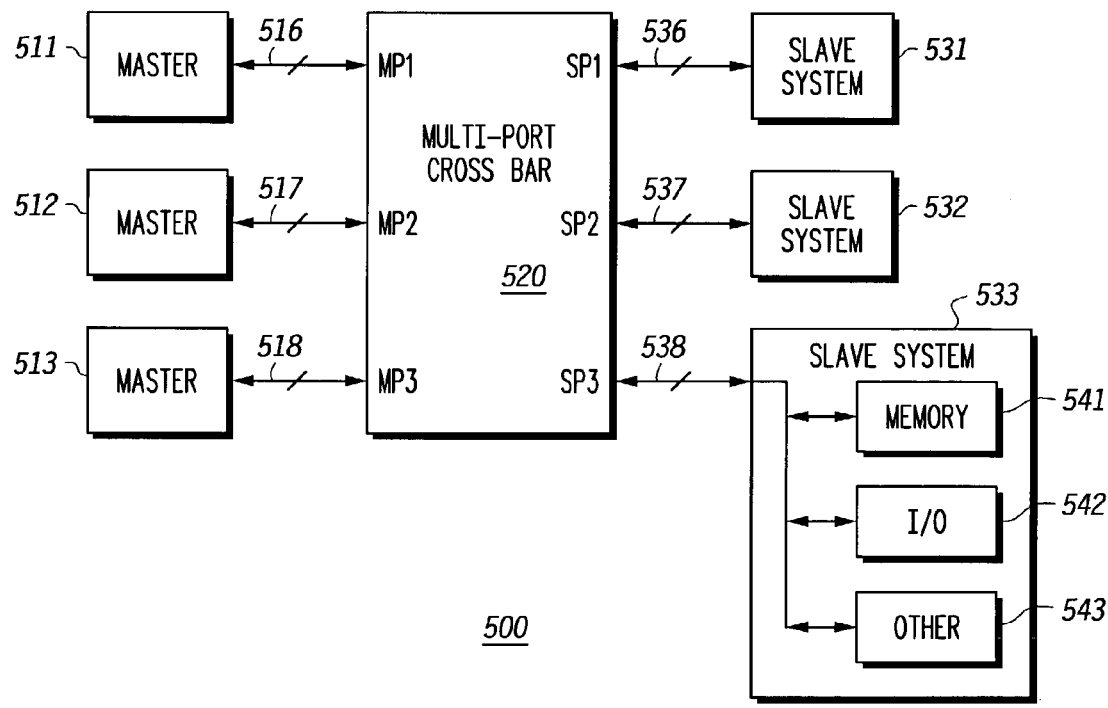
FIG. 5 illustrates, in block diagram form, a system in accordance with another embodiment of the present disclosure.

FIG. 5 illustrates a system 500 that is an alternate embodiment of the present disclosure. System 500 comprises Masters 511–513, Slave Systems 531–533, and a Multi-Port Cross Bar 520. Each of the Masters 511–513 are coupled to a different master port of the Multi-Port Cross Bar 520 by busses 516–518, respectively. Each of the Slave Systems 531–533 are coupled to a different slave port of the Multi-Port Cross Bar 520. Slave system 533 may include memory 541, I/O 542, and other features 543. Multi-port cross bars, such as Multi-Port Cross Bar 520, allow a master device coupled to a master port to access a particular slave bus coupled to one of the slave ports. For example, Master 511 can request, and be granted, access to the system bus 538 on slave port SP3. At the same time that Master 511 has access of the system bus 538, one of the other Masters 512 and 513 can have access to either of the other two system busses 536 and 537.

Figure 6:
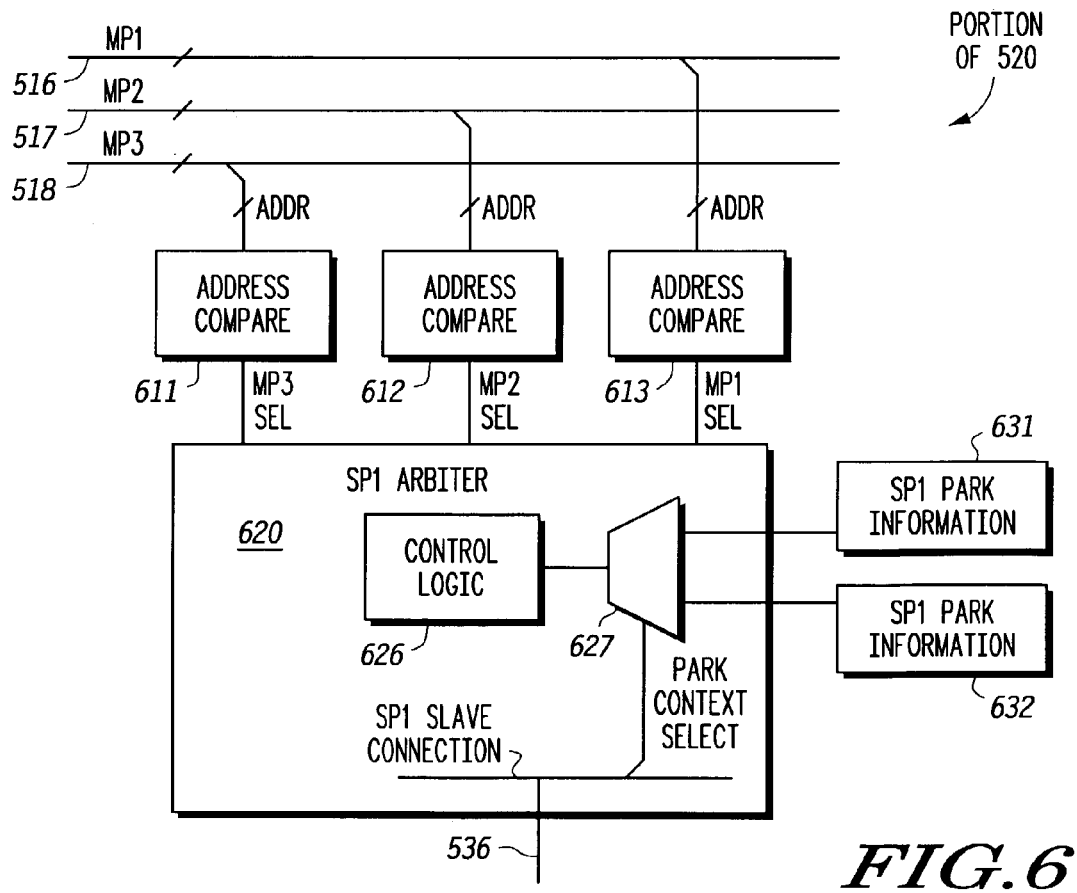
FIG. 6 illustrates, in block diagram form, a portion the system of FIG. 5 in greater detail.

Each slave Port SP1–SP3 of the Multi-Port Cross Bar 520 has an arbiter associated with it to arbitrate among the Masters 511–513, and to handle parking of masters. FIG. 6 illustrates a specific implementation of control logic associated with port SP1, however, the control logic of FIG. 6 will typically be duplicated for each of the ports SP1–SP3.

FIG. 6 illustrates a portion of system 500 comprising Address Compare Modules 611–613, SP1 Arbiter 620, SP1 Park Information 631, and SP1 Park Information 632. In operation, the SP1 Arbiter 620 is coupled to the System Bus 536 through the slave port SP1, the Master bus 516 through master port MP1, the Master bus 517 through master port MP2, and the Master bus 518 through master port MP3. Based upon arbitration information, the SP1 Arbiter 620 will provide access to the System bus 536 to one of the master busses 516–518 in response to one or more bus requests.

Part of the arbitration process can include indicating which master is to be parked on the system bus 536. Different sets of parking information is stored in a plurality of SP1 Park Information locations including SP1 Park Information 631 and SP1 Park Information 632, which can contain parking information and options such as those described previously herein. One of the SP1 Park Information 631 and 632 is accessed based upon a PARK CONTEXT SELECT signal, which is provided from a system device over the system bus 536 to a multiplex function 627. Because each slave port has equivalent arbitration logic available (not illustrated), each slave port can provide its own PARK CONTEXT SELECT signal as well as have its own sets of parking information available to control arbitration. Therefore, each slave port SP1–SP3 can have the same, or different, master ports MP1–MP3 parked at any given time.

Figure 7:
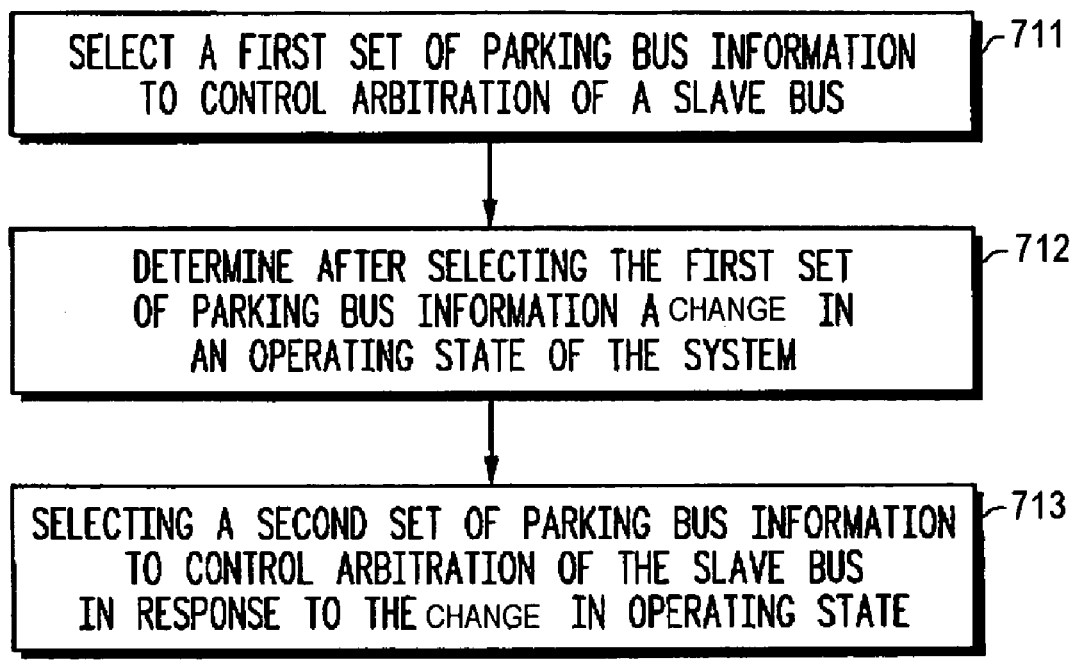
FIG. 7 illustrates, in flow diagram form, a method in accordance with the present disclosure.

FIG. 7 illustrates, in flow diagram form, a method in accordance with the present disclosure. At step 711, a first set of bus parking information is selected to control arbitration of a slave bus. At step 712, a change of operating state is determined to have occurred, where step 712 occurs after step 711. At step 713, a second set of parking bus information to control arbitration of the slave bus is selected in response to the change in operating state detected at step 712.

In summary it should be apparent from a review of the foregoing disclosure that various advantages can be achieved by using multiple sets of bus parking information in the various manners indicated. By reducing the time needed to switch bus parking information in response to a system context being changed, increased system performance can be realized.

In the preceding detailed description of the figures, reference has been made to the accompanying drawings, which form a part thereof, and in which is shown by way of illustrations specific embodiments in which the invention may be practiced. These embodiments are described in sufficient detail to enable those skilled in the art to practice the invention, and it should be understood that other embodiments may be utilized and that logical, mechanical, chemical, and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present disclosure is not intended to be limited to the specific form set forth herein, but on the contrary, it is intended to cover such alternatives, modifications, and equivalents as can be reasonably included within the spirit and scope of the invention. The preceding detailed description is therefore not to be taken in a limiting sense and the scope of the present disclosure is defined only by the appended claims.

What is claimed is:

1. A data processing system comprising:
   a plurality of bus masters;
   a first bus coupled to the plurality of bus masters;
   a first storage location to store a first bus master parking information for the first bus;
   a second storage location to store a second bus master parking information for the first bus; and
   a first arbiter comprising a first park context input, a plurality of request inputs coupled to the plurality of bus masters, wherein the first arbiter is coupled to the first storage location and to the second storage location, and each one of the plurality of request inputs is coupled to one of the plurality of bus masters, and the first park contest input is to receive a first state to indicate which of the first bus master parking information and the second bus master parking information the first arbiter is to access.

2. The system of claim 1 wherein the first bus master parking information comprises a writeable field to indicate which one of the plurality of bus masters is to be parked on the first bus.

3. The system of claim 1 further comprising:
   a second bus coupled to the plurality of bus masters;
   a third storage location to store a third bus master parking information for the second bus;
   a fourth storage location to store a fourth bus master parking information for the second bus; and
   a second arbiter comprising a second park context input, a plurality of request inputs coupled to the plurality of bus masters, wherein the second arbiter is coupled to the third storage location and to the fourth storage location, and each one of the request inputs is coupled to one of the plurality of bus masters, and the second park context input is to receive a second state to indicate which of the third bus master parking information and the fourth bus master parking information the second arbiter is to access.

4. The system of claim 3, wherein the first arbiter and the second arbiter are part of a common arbiter.

5. The system of claim 1 further comprising a slave device coupled to the first park context input.

6. The system of claim 1 further comprising a slave device comprising an interrupt coupled to the first park context input.

7. The system of claim 1, wherein the plurality of request inputs are bus request inputs coupled to a plurality of bus request outputs of a plurality of bus masters.

8. The system of claim 1 further comprising:
   a crossbar switch to couple the plurality of bus masters to the first bus.

* * * * *

UNITED STATES PATENT AND TRADEMARK OFFICE
CERTIFICATE OF CORRECTION

PATENT NO. : 7,099,973 B2  Page 1 of 1
APPLICATION NO. : 10/402165
DATED : August 29, 2006
INVENTOR(S) : William C. Moyer et al.

It is certified that error appears in the above-identified patent and that said Letters Patent is hereby corrected as shown below:

Column No. 5, Line No. 18 change "contest" to --context--

Signed and Sealed this

Twenty-eighth Day of November, 2006

JON W. DUDAS
*Director of the United States Patent and Trademark Office*